(12) United States Patent
Nelson et al.

(10) Patent No.: US 9,304,803 B2
(45) Date of Patent: Apr. 5, 2016

(54) COOPERATIVE APPLICATION WORKLOAD SCHEDULING FOR A CONSOLIDATED VIRTUAL ENVIRONMENT

(71) Applicant: VMware, Inc., Palo Alto, CA (US)

(72) Inventors: Michael Nelson, Alamo, CA (US); Jayanth Gummaraju, San Francisco, CA (US); Kinshuk Govil, Los Altos, CA (US); Anne Holler, Los Altos, CA (US); Richard McDougall, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 225 days.

(21) Appl. No.: 13/674,180

(22) Filed: Nov. 12, 2012

(65) Prior Publication Data

US 2014/0137104 A1      May 15, 2014

(51) Int. Cl.
*G06F 9/455* (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,321,568 B2 * | 1/2008 | Kosanovic | | G06F 9/505 370/286 |
| 8,219,998 B2 * | 7/2012 | Taylor et al. | | 718/105 |
| 8,531,955 B2 * | 9/2013 | Dennis | | 370/235 |
| 2002/0082856 A1 * | 6/2002 | Gray | | G06F 9/50 718/104 |
| 2010/0211680 A1 * | 8/2010 | Chatterton | | G06F 9/5011 709/226 |
| 2011/0154350 A1 * | 6/2011 | Doyle et al. | | 718/104 |
| 2012/0311598 A1 * | 12/2012 | Bachar et al. | | 718/104 |
| 2012/0317579 A1 * | 12/2012 | Liu | | 718/104 |
| 2012/0317583 A1 * | 12/2012 | Corbea et al. | | 718/104 |
| 2014/0006620 A1 * | 1/2014 | Assuncao et al. | | 709/226 |

OTHER PUBLICATIONS

Benjamin Hindman et al., "Mesos: A Platform for Fine-Grained Resource Sharing in the Data Center", 8th USENIX Symposium on Networked Systems Design and Implementation, Apr. 1, 2011.
Benjamin Hindman et al., "Mesos: A Platform for Fine-Grained Resource Sharing in the Data Center", University of California, Berkeley, Technical Report No. UCB/EECS-2010-87, May 26, 2010.
Arun C. Murthy, "Next Generation of Apache Hadoop MapReduce—The Scheduler", Yahoo! Hadooop Blog, available at http://developer.yahoo.com/blogs/hadoop/posts/2011/03/mapreduce-nextgen-scheduler/, Mar. 16, 2011.

* cited by examiner

*Primary Examiner* — Emerson Puente
*Assistant Examiner* — Zhi Chen
(74) *Attorney, Agent, or Firm* — Patterson & Sheridan LLP

(57) ABSTRACT

Application resource scheduler module is provided to achieve cooperative application workload scheduling for a consolidated virtual environment. The application resource scheduler aids an application workload scheduler that is part of a distributed computing application, such as Hadoop, to achieve a specified relative priority of the application workload virtual machines to other virtual machines in the virtual environment. The application resource scheduler assists in achieving cooperative workload scheduling by revising the amount of resources that the application workload scheduler sees as available and by setting resource controls for the virtual machines of the distributed computing application to influence the resources the virtual machines receive from the underlying consolidated virtual environment.

19 Claims, 6 Drawing Sheets

COOPERATIVE APPLICATION WORKLOAD SCHEDULING FOR A CONSOLIDATED VIRTUAL ENVIRONMENT

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

SUMMARY

One or more embodiments disclosed herein provide a method for managing a cluster for a distributed computing application. The method includes receiving, from a user, an indication specifying a workload priority of an application workload for a distributed computing application to other workloads executing in a virtualized computing system. The distributed computing application may include a workload scheduler configured to distribute execution of the application workload to a plurality of virtual machines (VMs) allocated from a resource pool within the virtualized computing system. The method further includes modifying one or more resource controls for the resource pool based on the workload priority, and determining an amount of available computing resources within the virtualized computing system based on the workload priority. The method includes modifying a first VM of the plurality of VMs to adjust an amount of computing resources seen by the workload scheduler to be available for execution of the application workload based on the determined amount of available computing resources.

Further embodiments of the present invention include a non-transitory computer-readable storage medium that includes instructions that enable a processing unit to implement one or more of the methods set forth above or the functions of the computer system set forth above.

DETAILED DESCRIPTION

One or more embodiments disclosed herein provide methods, systems, and computer programs for managing resources in a virtualized environment in which a distributed computing application, such as Hadoop, executes. An application workload scheduler for the distributed computing application manages execution of a workload on consolidated virtual environment having a set of virtual machines, considering the availability of memory and CPU resources as well as other attributes that are relevant to the application workload's performance, including data storage and networking locality. Due to the dynamic nature of the consolidated virtual environment, the application workload scheduler may need to account for the resources consumed by virtual machines not under its management and for its workload's importance relative to those other virtual machines.

In one embodiment, an application resource scheduler receives input, from a user, indicating a workload priority of an application workload of a distributed computing application relative to other application workloads. The application resource scheduler modifies the underlying virtualized environment to tailor the distributed computing applications' resource usage with respect to other workloads in the virtualized environment. For example, the application resource scheduler may modify limit, reservation, and shares resource controls for the resource pool in which the distributed computing application executes. In another example, the application resource scheduler may manipulate the virtual machines that act as worker nodes for the distributed computing application based on the workload priority.

Figure 1:
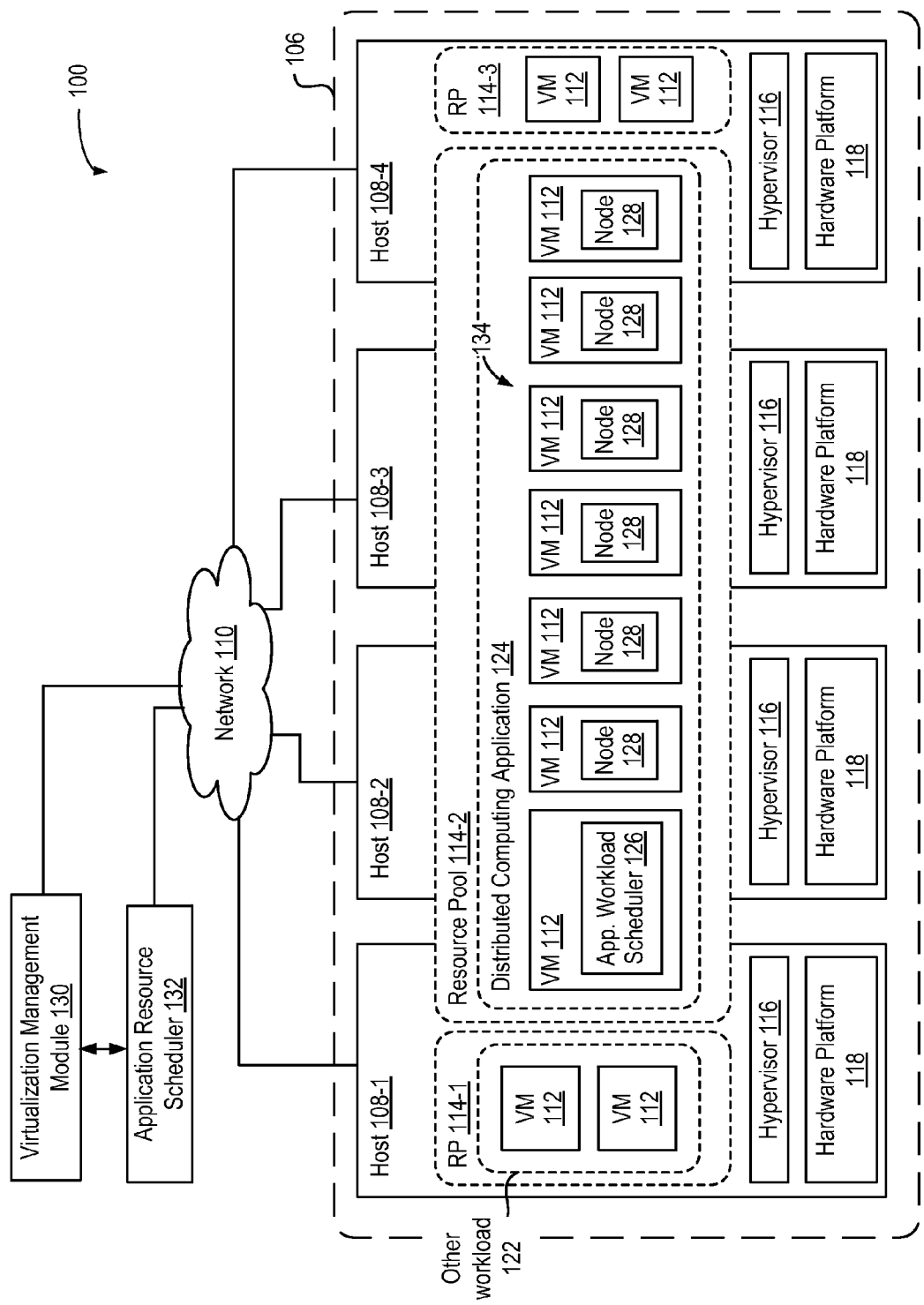
FIG. 1 is a block diagram that illustrates a virtualized computing system with which one or more embodiments of the present invention may be utilized.

FIG. 1 is a block diagram that illustrates a computing system 100 with which one or more embodiments of the present invention may be utilized. As illustrated, computing system 100 includes a host group 106 of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. The VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

In one embodiment, VMs 112 are organized into a plurality of resource pools, identified as resource pool 114-1, 114-2, and 114-3, which logically partitions available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources to the set of VMs 112 by changing settings on the VMs' enclosing resource pool 114.

Figure 2:
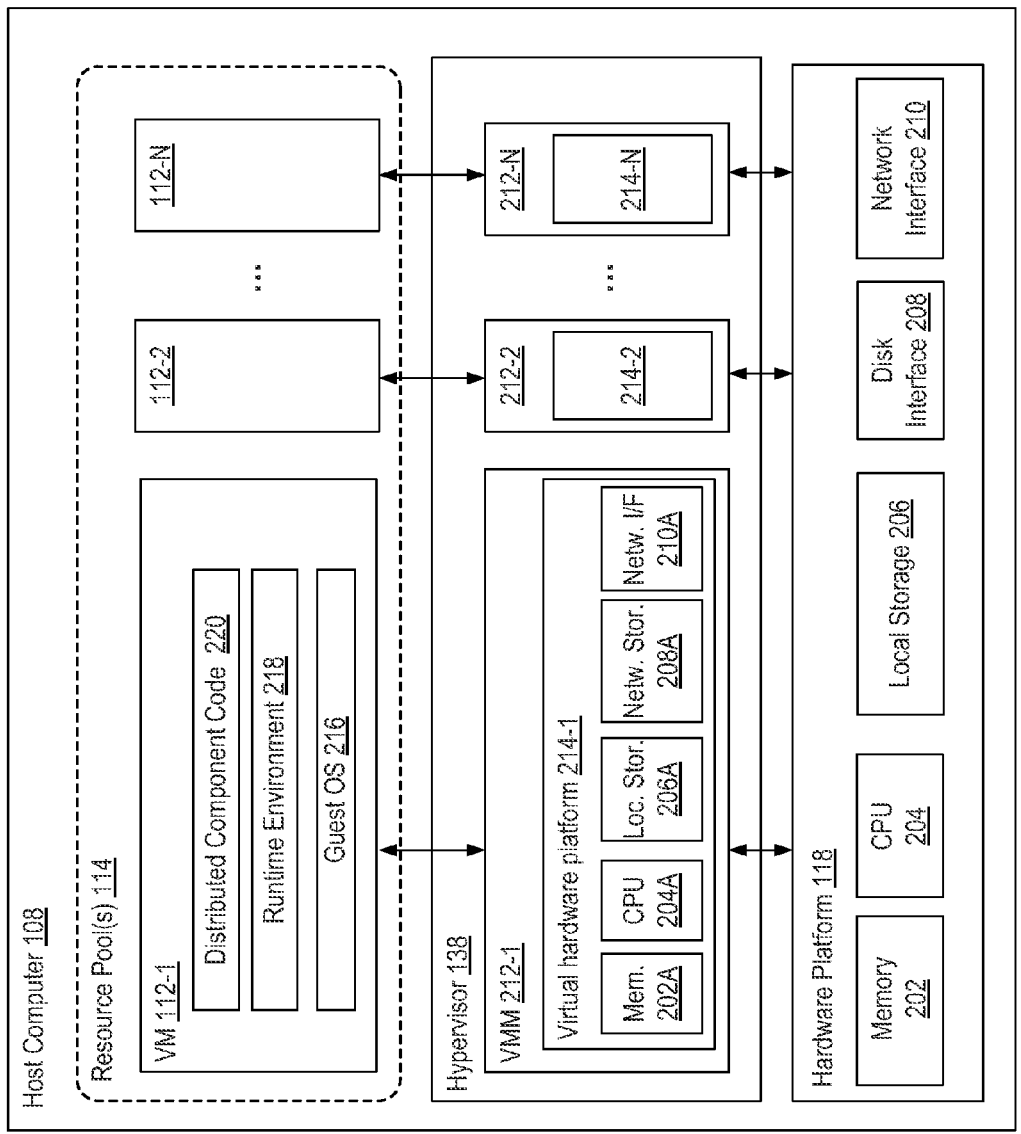
FIG. 2 is a block diagram that illustrates a host computer supporting one or more virtual machines, according to one embodiment of the present invention.

As shown, VMs 112 of hosts 108 may be provisioned and used to execute a number of workloads (e.g., workloads 122) that deliver information technology services, including web services, database services, data processing services, and directory services. In one embodiment, one or more VMs 112 are configured to serve as a VM node 128 of a cluster 134 generated and managed by a distributed computing application 124 configured to elastically distribute its workload over a plurality of VMs that acts as nodes 128 of the distributed computing application. Distributed computing application 124 is configure to incorporate additional VMs or releasing unused VM nodes 128 from its cluster—thereby growing and shrinking its profile within computing system 100—based on a particular workload demand. VMs 112 executing as nodes 128 on host 108 are shown in greater detail in FIG. 2.

As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a "Node Manager" function, "Task Container" function, "Name Node" function, "Data Node" function, or a workload scheduler function, described further below. Alternatively, each VM 112 may include distributed software component code 220 for distributed computing application 124 configured to run natively on top of guest OS 216.

As depicted in FIG. 1, computing system 100 includes a virtualization management module 130 that may communicate to the plurality of hosts 108 via network 110. In one embodiment, virtualization management module 130 is a computer program that resides and executes in a central server, which may reside in computing system 100, or alternatively, running as a VM in one of hosts 108. One example of a virtualization management module is the vCenter® Server product made available from VMware, Inc. Virtualization management module 130 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 130 is configured to communicate with hosts 108 to collect performance data and generate performance metrics (e.g., counters, statistics) related to availability, status, and performance of hosts 108, VMs 112, and resource pools 114.

In one embodiment, virtualization management module 130 is configured to adjust one or more resource controls associated with the VMs 112 and resource pools 114. Resource controls are configurations, attributes, and other settings that specify how hardware resources (e.g., memory 202, CPU 204, storage, network bandwidth) are allocated and utilized by VMs 112 and resource pools 114. In one embodiment, to manage how resources (e.g., CPU, memory, storage, network) are allocated to VMs 112, virtualization management module 130 modifies the resource controls for "reservation," "limit," and "shares" for one or more VMs 112, and the resource controls for "reservation," "limit," and "shares" assigned to one or more resource pools 114.

"Reservation" refers to a guaranteed reservation for a virtual machine (or resource pool). When a virtual machine is powered on, the hypervisor guarantees that amount of resources (e.g., in MHz or MB) even when the host is heavily loaded. For example, a reservation of 8 GB RAM specifies a lower bound on the amount of physical memory that a hypervisor reserves for a virtual machine, even when memory is over committed. It may be appreciated that until a virtual machine (or resource pool) accesses its full reservation, the hypervisor can allocate any unused portion of its reservation to other virtual machines. After the guest's workload increases and the virtual machine consumes its full reservation, the virtual machine is allowed to keep this memory (e.g., the memory is not reclaimed).

In some embodiments, virtualization management module 130 may specify an expandable reservation type for a "Reservation" resource control assigned to a resource pool 114. When a virtual machine is powered on in a resource pool with an expandable reservation, the hypervisor checks during admission control whether sufficient resources are available to satisfy any specified resource controls (e.g., whether reservations of the virtual machines in the resource pool combined exceeds the reservation of the resource pool). In contrast to a fixed reservation, an expandable reservation enables a resource pool to reserve available resources from a parent resource pool if the resource pool does not have enough resources available locally.

"Limit" refers to an upper limit for CPU or memory for a virtual machine (or resource pool). When applied to a specific virtual machine, the host may allocate more than the reservation to a virtual machine, but may not allocate more than the limit, even if there is unutilized CPU or memory on the system. When applied to a resource pool, the limit specifies an upper bound for the amount of CPU or memory that a host makes available to the resource pool.

"Shares" refers to a relative priority or importance of a virtual machine (or resource pool), for example, when more than the reservation is available. For example, if a virtual machine has twice as many shares of a resource as another virtual machine, the virtual machine is entitled to consume twice as much of that resource when these two virtual machines are competing for resources. Shares may be specified as "High," "Normal," or "Low" having corresponding share values with a 4:2:1 ratio, respectively, or may be specified as a custom share value. When applied to a resource pool, the resource control for "shares" specifies the number of CPU or memory shares the resource pool has with respect to a parent resource pool's total. Sibling resource pools share resources according to their relative share values bounded by the reservation and limit.

In one embodiment, virtualization management module 130 is configured to provide virtual environment scheduler functionality that balances the VMs across hosts 108 of the host group 106. For example, if the resource usage on one of the VMs in a resource pool drastically changes, the virtualization management module 130 moves around VMs among the physical hosts to optimize distribution of virtual machines across the hosts. Further, if the overall workload of all VMs decreases, the virtualization management module 130 may power down some of the physical hosts and consolidate the VMs across the remaining physical hosts. One example of a virtual environment scheduler is the VMware Distributed Resource Scheduler (DRS®) product made available from VMware, Inc.

In one embodiment, distributed computing application 124 includes an application workload scheduler 126 (e.g., executing in a VM 112) configured to manage execution of workloads running one or more within VM nodes 128 associated with the distributed computing application. During operation, application workload scheduler 126 may query VM nodes 128 allocated to the distributed computing application to determine their status and the availability of resources for processing additional workloads. For example, application workload scheduler 126 may query VMs 112-3 to 112-9 allocated to the distributed computing application to determine if the VMs are up, and if they are up, how much RAM may be allocated from each VM for executing a portion of the workload performed by the distributed computing application as a whole.

Conventional workload schedulers for distributed computing applications (e.g., Hadoop application) are designed to manage execution of a workload on a dedicated set of physical computing elements, under an assumption that the full set of dedicated computing resources (e.g., memory and CPU) are available, as well as based on other pre-determined attributes that are relevant to the application workload's performance, including data storage and networking locality. However, such an application workload scheduler may face challenges when attempting to schedule execution of a workload within a virtualized environment, as depicted in FIG. 1, that may have computing resources consumed by other VMs not associated with the distributed computing application. For example, application workload scheduler 126 may accept jobs (e.g., from a user) for execution by distributed computing application 124 within the virtualized environment of computing system 100. Application workload scheduler 126 may then schedule execution a received job within VM nodes 128 by splitting the job into small tasks and distributing the tasks, a process sometimes referred to as task placement, on the nodes 128 based on a scheduling or placement policy. Scheduling and placement policies typically factor in CPU and memory utilization of each node, for example, to balance use of computing resources. However, the scheduled use of computing resources for the distributed application workload does not factor in resource contention with other workloads running within the virtualized environment. For example, application workload scheduler 126 may be attempting to place a task based on availability of nodes 128 while the virtualization management module 130 is attempting to load balance both application workload VMs and non-application workload VMs across hosts 108, thereby resulting in inconsistent results. For sake of discussion, a workload for distributed computing application 124 may be referred to herein as a "distributed application workload" or "application workload", where as other workloads running within the computing system 100 that are not for distributed computing application 124 (e.g., workload 122) may be referred to as "non-distributed application workloads" or "non-application workloads".

Accordingly, embodiments of the present invention provide an application resource scheduler 132 configured to enable cooperative application workload scheduling for a consolidated virtualized environment. Application resource scheduler 132 may act an intermediary between application workload scheduler 126 and the virtualization management module 130. In one embodiment, application resource scheduler 132 is configured to determine a priority of a workload associated with distributed computing application 124 relative to a priority of other workloads running within the virtualized environment but are not associated with distributed computing application 124. Application resource scheduler 132 is configured to communicate (e.g., via an API call) with virtualization management module 130 to modify the virtualized environment based on the determined workload priority and further based on one or more performance metrics associated with computing resources of system 100. In some embodiments, application resource scheduler 132 is configured to revise the amount of resources that the application workload scheduler sees as available. In some embodiments, application resource scheduler 132 is configured to set resource controls for the VMs 112 allocated for distributed computing application 124 to influence the resources that the distributed computing application 124 receives from the underlying virtual environment scheduler (e.g., virtualization management module 130). For example, under a "scavenger"-like scheme, application resource scheduler 132 may modify resource controls for a resource pool (e.g., resource pool 114-2) supporting execution of the application workload of distributed computing application 124 such that the application workload uses resources that are currently spare with respect to the other non-application workloads running in the virtualized environment, and releases those resources should other workloads burst. Under a "predator"-like scheme, application resource scheduler 132 may modify resource controls for resource pool 114-2 such that the application workload obtains all resources not currently reserved by other non-application workloads within the virtualized environment. While application resource scheduler 132 is depicted in FIGS. 1 and 3 as a separate component that resides and executes on a separate server, it is appreciated that the application resource scheduler 132 may alternatively reside in any one of the computing devices of the virtualized computing system 100, for example, such as the same central server where the virtualization management module 130 resides.

Example Hadoop Application with Resource Scheduler

Figure 3:
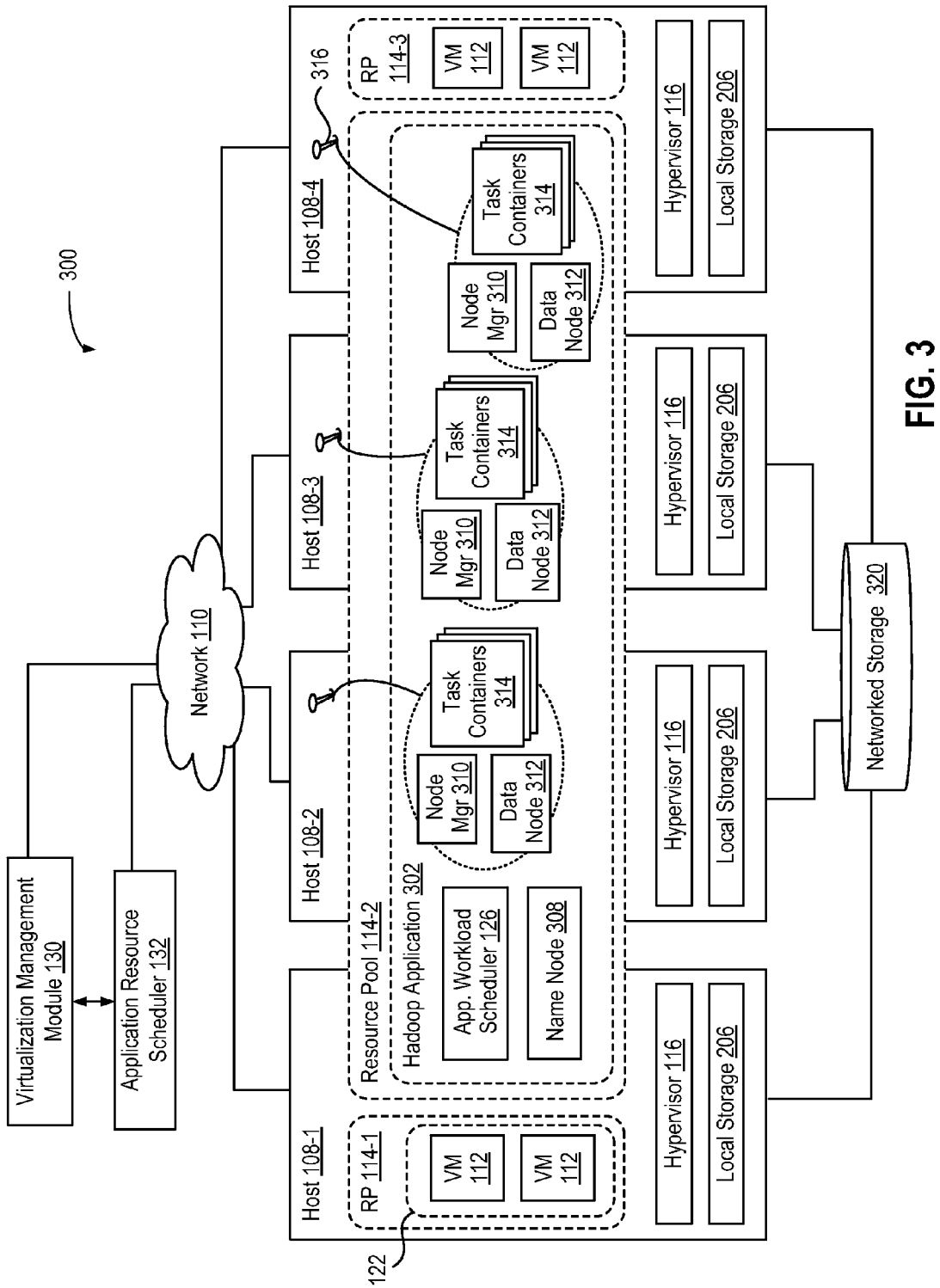
FIG. 3 is a block diagram that illustrates a virtualized computing system having a resource scheduler configured to support a Hadoop application, according to one embodiment of the present invention.

FIG. 3 is a block diagram that illustrates a virtualized computing system 300 having an application resource scheduler configured to support an example distributed computing application, according to one embodiment of the present invention. In the embodiment shown in FIG. 3, the distributed computing application is a Hadoop application 302 configured to process a large set of data using a distributed set of workload nodes (e.g., VMs 112) allocated to Hadoop application 302. It should be recognized that alternative architectures for a Hadoop application having some form of an application workload scheduler may be utilized with the techniques described herein. It should be further recognized that, while embodiments of present invention are described in terms of a Hadoop installation, other distributed computing applications, such as web applications having a front end scheduler or large scalable database system (e.g., MongoDB, Apache Cassandra), may be configured and utilized according to the techniques provided herein.

In one embodiment, Hadoop application 302 includes an application workload scheduler 126 (e.g., executing as a VM) which accepts jobs from clients and schedules corresponding workloads for execution on a plurality of nodes that are part of Hadoop application 302. When application workload scheduler 126 receives a request to execute a job within Hadoop application 302, application workload scheduler 126 may determine what resources should be considered as available for executing the requested job and the availability of those resources on a per-host basis. In one embodiment, application workload scheduler 126 uses information from a name node 308 (e.g., executing as a VM) to determine where data is located within distributed nodes of Hadoop application 302 (e.g., local storage 206 or networked storage 320), and information from the plurality of node managers 310, described below, to determine what resources are available for running the job. In some implementations of Hadoop, application workload scheduler 126 may be referred to as a Hadoop Resource Manager (HRM) or a "JobTracker" node. In one embodiment, application workload scheduler 126 may be originally configured to schedule workloads on clusters of nodes that are physical machines made of commodity hardware, and as such, is unaware that the nodes are in fact virtual machines within a virtualized environment. For example, application workload scheduler 126 may track "machine" availability and scheduling invariants when determining how to distribute work among the nodes, even though nodes of the Hadoop application are VMs 112 drawn from a designated resource pool (e.g., resource pool 114-2).

In one embodiment, each host 108 used by Hadoop application 302 uses a local data store (e.g., local storage 206), networked storage 320, or both to store some part of the data used by Hadoop application 302. Each host 108 having local Hadoop data includes a plurality of VMs pinned to the host (as depicted by pin 316) including a node manager 310, a data node 312, and a plurality of task containers 314. Each task container 314 (e.g., executing on a VM) is a worker node that carries out requested tasks (e.g., map tasks, reduce tasks) provided by application workload scheduler 126. In one embodiment, a task container VM 314 is configured to run one or more tasks in one or more available "slots". In one example, each slot may be implemented as an instance of a runtime environment (e.g., Java Virtual Machine) executing distributed software component code (e.g., code 220) for completing a single task. As such, in some embodiments, each task container VM 314 may execute multiple instances of the runtime environment to execute in parallel multiple tasks assigned to the task container VM by the workload scheduler 126. Data node 312 accesses Hadoop data stored on the local data store (e.g., local storage 206). Node manager 310 (e.g., executing on a VM) is a per-host agent responsible for managing task containers 314, as well as monitoring and reporting task containers' resource usage (e.g., CPU, memory, storage, network) back to application workload scheduler 126. If a task container 314 fails due to software error, network problems, or other issues, application workload scheduler 126 is able to adjust its scheduling of the application workload accordingly. For example, application workload scheduler 126 may mark failed task containers as "unavailable" for accepting tasks, and modify placement of subsequent tasks to other task containers in same nodes or other nodes based on the reduced amount of available resources.

Figure 4:
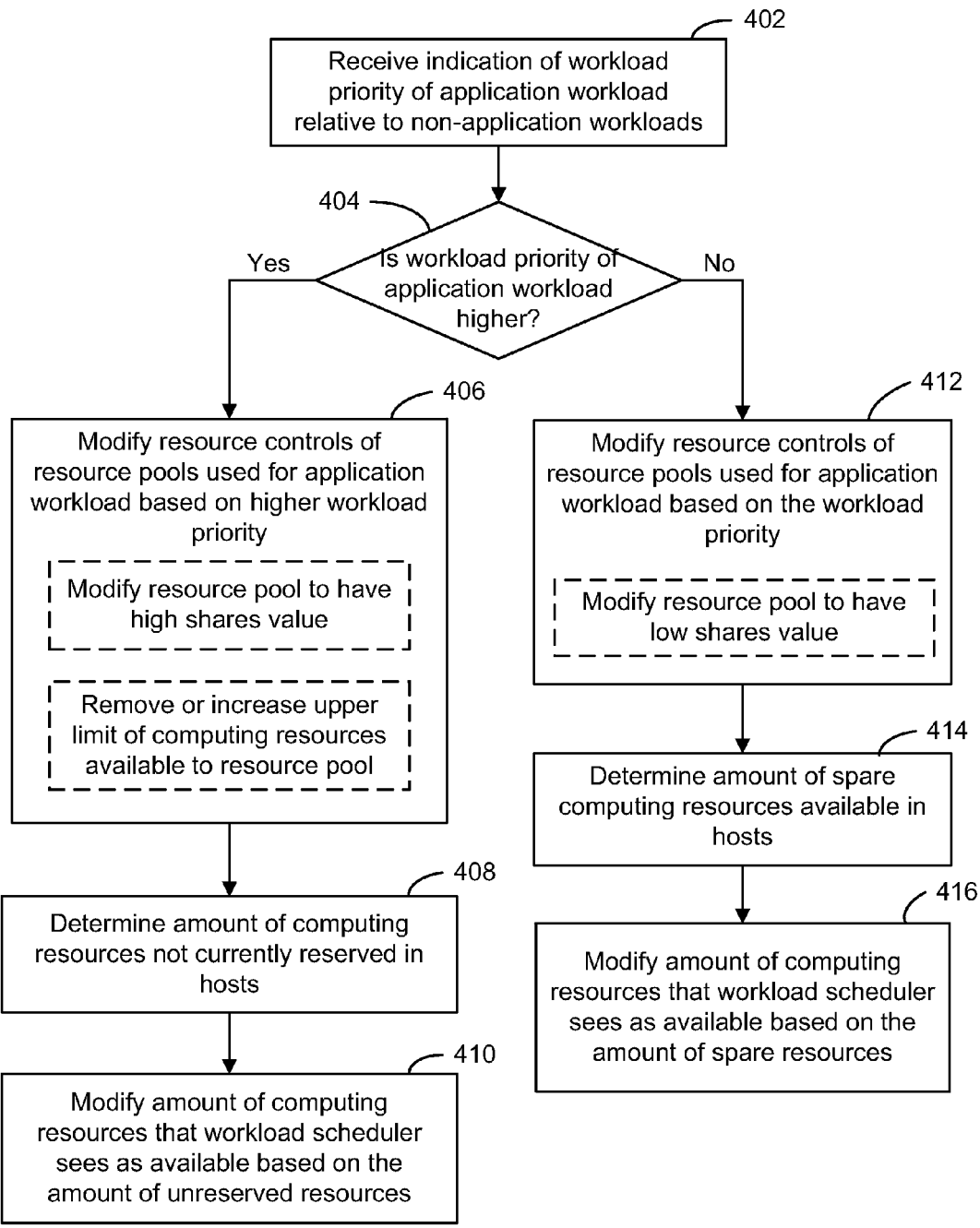
FIG. 4 is a flow diagram that illustrates steps for a method of managing computing resources of a virtualized environment, according to an embodiment of the present invention.

FIG. 4 is a flow diagram that illustrates steps for a method of managing a distributed computing application within a virtualized environment, according to an embodiment of the present invention. It should be recognized that, even though the method is described in conjunction with the system of FIGS. 1 and 3, any system configured to perform the method steps is within the scope of embodiments of the invention.

At step 402, application resource scheduler 132 receives (e.g., via user input from a system administrator) an indication of a relative priority of an application workload to other non-application workloads executing in computing system 100, referred to herein as a "workload priority". In one embodiment, application resource scheduler 132 receives an indication of a high, medium, or low priority of the application workload to other workloads. In other embodiments, application resource scheduler 132 may receive an indication specifying one of a plurality of hierarchical tiers, such as "Tier-1", "Tier-2", "Tier-3", etc. In other embodiments, application resource scheduler 132 may receive an indication to operate in a "predator" mode where the application workload has a higher workload priority, or to operate in a "scavenger" mode where the application workload has a neutral to lower workload priority. In one embodiment, the received indication is included in a job request for processing a Hadoop workload. In other embodiments, the received indication may be set by a system administrator managing the computing system 100 rather than a Hadoop user.

At step 404, application resource scheduler 132 determines whether the received indication specifies that the workload priority of the application workload is higher. If so, application resource scheduler 132 proceeds to step 406; otherwise, application resource scheduler 132 proceeds to step 412.

At step 406, application resource scheduler 132 modifies one or more resource controls of resource pools (e.g., resource pool 114-2) that contain VMs belonging to the application workload of interest based on the higher workload priority. In some embodiments, application resource scheduler 132 may modify (e.g., via API call to virtualization management module 130) the resource pool to have a high "shares" value that specifies a higher relative priority for the resource pool 114-2 when competing for resources (e.g., CPU, memory) with sibling resource pools 114-1 and 114-3 having VMs that run non-application workloads 122. In some embodiments, application resource scheduler 132 removes or increases an upper limit of the resource pool's memory and CPU allocation (e.g., by setting a "limit" field to "Unlimited"). It is appreciated that the modified resource controls are then respected by the underlying virtualized environment when allocating computing resources of hardware platform 118 (e.g., memory 202, CPU 204). For example, the virtualization management module 130 may reclaim memory from or distribute less extra memory to sibling resource pools 114-1 and 114-3 having VMs that run non-application workloads 122 according to the high shares value indicating a higher priority for resource pool 114-2.

In some embodiments, application resource scheduler 132 may modify a configuration to disable virtual environment scheduler functionality for VMs belonging to the application workload of interest based on a higher workload priority. It is appreciated that if the virtual environment scheduler functionality remains enabled for the resource pools that contain VMs belonging to the non-application workloads, virtualization management module 130 may shift (sometimes referred to as "v-motion") away the non-application workload VMs to other hosts.

At step 408, application resource scheduler 132 determines an amount of computing resources not currently reserved by other non-application workloads (e.g., workload 122) within hosts 108. It is appreciated that other non-application workloads 122 may be running on VMs that use more resources than guaranteed by the VMs' reservation (e.g., 8 GB RAM). In one embodiment, application resource scheduler 132 determines an amount of unreserved resources (e.g., CPU 204, memory 202) based on metrics provided by virtualization management module 130. In one embodiment, application resource scheduler 132 calculates for each host 108 and summates the amount of unreserved memory as the difference between the amount of memory capacity of the host and the amount of memory reservation of the host. For example, application resource scheduler 132 may query (e.g., via API call) virtualization management module 130 to obtain a memory counter (e.g., memory.totalCapacity.average) indicating a total amount of memory reservation used by and available for powered-on virtual machines and virtualization overhead on the host and another memory counter (e.g., memory.reservedCapacity.average) indicating a total amount of memory reservation used by powered-on virtual machines and virtualization overhead on the host. It has been determined that use of the above-described performance metrics has advantages over simply using the amount of unconsumed memory. For instance, it has been determined that in a steady state of host groups such as in computing system 100, all host memory may be highly consumed already, and workload scheduler 126 and virtualization management module 130 may not manage application workloads and virtualized resources with respect to consumed memory. For clarity, the present disclosure describes calculation of memory metrics, however it should be recognized that embodiments of the present invention may be performed similarly with CPU metrics.

At step 410, application resource scheduler 132 modifies the amount of computing resources that the application workload scheduler 126 sees as available based on the determined amount of unreserved resources in hosts 108. In one embodiment, application resource scheduler 132 manipulates the virtualized infrastructure comprised of virtual machines and resource pools (e.g., resource pool 114-2) that underlie the distributed computing application 124 to change the amount of resources believed by the workload scheduler to be available, thereby influencing the scheduling and placement strategy of application workload scheduler 126 for executing an application workload.

Figure 5A:
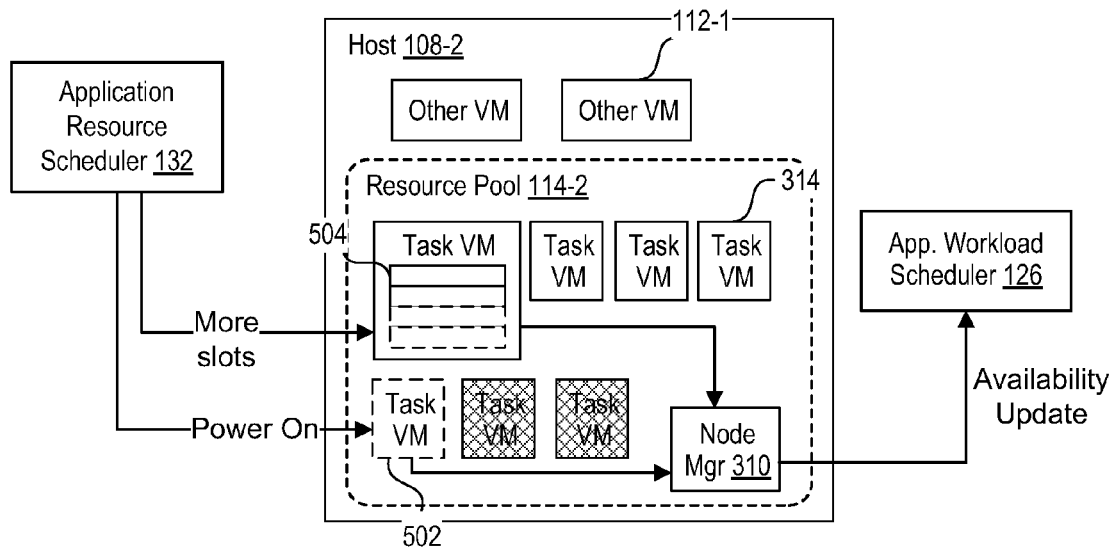
FIGS. 5A and 5B illustrates various techniques for manipulating a virtualized infrastructure running the application workload based on a workload priority of the application workload, according to embodiments of the present invention.

FIG. 5A is a block diagram that illustrates various techniques for manipulating the underlying virtualized infrastructure running the application workload, according to embodiments of the present invention. In one embodiment, application resource scheduler 132 powers on one or more worker VMs (e.g., task container VMs 314) having a resource allocation based on the determined amount of unreserved resources. As shown, the powered-on worker VM 502 may be configured to broadcast its availability upon launch to application workload scheduler 126 (e.g., via a node manager 310). Application workload scheduler 126 may then factor in the additional worker VMs and their corresponding computing resources when determining scheduling and task placement. In some embodiments, application resource scheduler 132 may divvy up the total amount of unreserved resources across hosts 108, and, within each host, power on one or more task container VMs 314 having an amount of CPU and memory resources equal to or less than the divided portion of unreserved resources. For example, if application resource scheduler 132 determines there are 4 GB of unreserved memory across four hosts 108-1 to 108-4, application resource scheduler 132 powers on one task container VM having a 1 GB of memory within host 108-1, host 108-2, host 108-3, and host 108-4.

In some embodiments, in contrast to powering on additional worker VMs, application resource scheduler 132 may modify existing worker VMs belonging to the distributed computing application 124 (e.g., task container VMs 314) to have an increased resource allocation based on the amount of unreserved resources determined at step 408. For example, application resource scheduler 132 may suspend a task container VM 314 (e.g., via an API call to virtualization management module 130), increase the memory allocation from 1 GB to 2 GB based on determining the hosts have 1 GB of unreserved memory, and re-start the VM. In another example, application resource scheduler 132 may modify a memory allocation to an instance of a runtime environment (e.g., Java Virtual Machine) and restart the instance. It should be recognized that the task container VM 314 may be configured to upon launch broadcast not just its availability to application workload scheduler 126, but also advertise its amount of resources, which is now 2 GB RAM. Application workload scheduler 126 may then factor in the increased amount of resources when determining scheduling and task placement.

In some embodiments where distributed computing application 124 is a Hadoop application, application resource scheduler 132 may modify task container VMs 314 to advertise a different number of available slots based on the amount of unreserved resources determined at step 408. In the embodiment shown in FIG. 5A, task container VMs 314 have a plurality of available "slots" 504, which are granular units of work capacity performed by a task container VM 314. For example, a single map task or reduce task takes up one slot 504. Application resource scheduler 132 may modify a distributed component configuration file on a task container VM 314 to increase the number of available slots 504 from 4 to 8, and then restart the task container VM 314. It should be recognized that the task container VM 314 may be configured to, upon launch, advertise its availability in terms of number of slots available for executing tasks. Application workload scheduler 126 may then factor in the increased availability of task slots when determining scheduling and task placement.

It is appreciated that while the above-described technique may use the unreserved CPU and memory resources for executing the distributed application workload, resource contention from non-application workloads may nevertheless preempt the distributed computing application's use of the unreserved resources. In some cases, a user might wish to further prioritize distributed application workloads within the computing system 100 to prevent preemption of the distributed computing application's resource use by non-application workloads.

Accordingly, in one embodiment, application resource scheduler 132 is configured to modify a reservation resource control of resource pools (e.g., resource pool 114-2) that contain VMs belonging to the application workload of interest to track the distributed computing application's burst of resource usage. In one embodiment, application resource scheduler 132 requests an increase in the "reservation" setting (e.g., X MHz of CPU, Y MB of RAM) of the resource pool for the application workload such that the associated resources are not reclaimed from the application workload while the workload is running. After the job has been completed, the application resource scheduler 132 reduces the reservation for the resource pool. It is appreciated that the increase in resource pool reservation has to be effectuated by the virtualization management module 130 at the host-group level and by the hypervisors 116 at the host-level. It has been determined that, by setting high shares on the resource pool and associated virtual machines as described in step 406 above, VMs belonging to the distributed computing application may receive higher priority during any resource contention or preemption, which may compensate for any latency in the reservation change becoming effective at the host level.

It should be recognized that in step 408, application resource scheduler 132 continues to monitor the availability of unreserved resources within the hosts on an ongoing basis, and expands and contracts the amount of resources that application workload scheduler 126 sees as available for running its jobs based on the determined amount of unreserved resources. For example, if application resource scheduler 132 detects a decrease in the amount of unreserved resources based on the above-described performance metrics, application resource scheduler 132 contracts the amount of resources seen as available by application workload scheduler 126, as depicted in FIG. 5B.

Figure 5B:
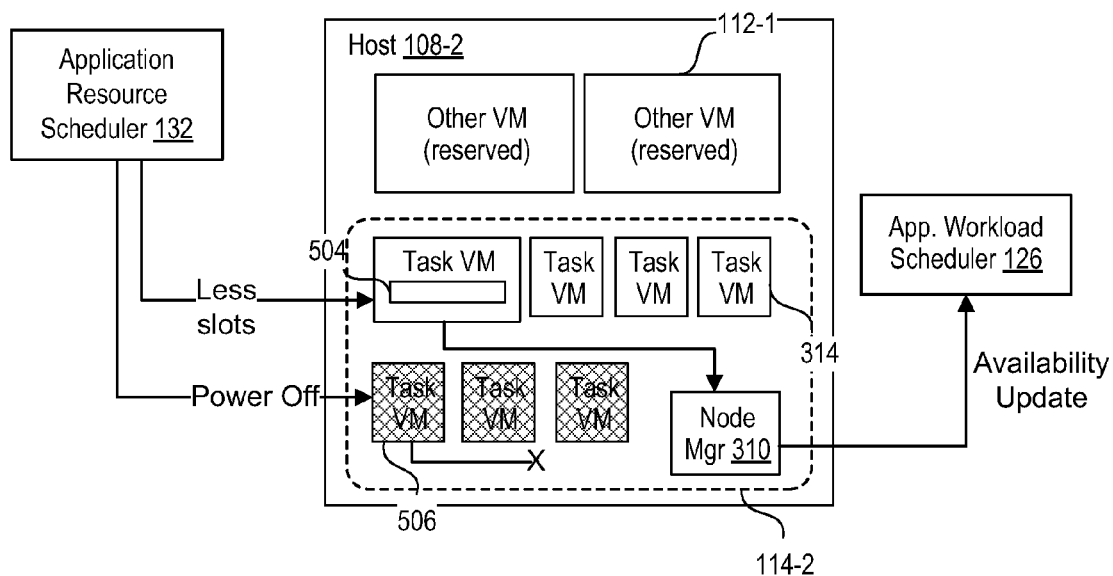

FIG. 5B illustrates various techniques for manipulating the underlying virtualized infrastructure running the application workload to contract the amount of resources seen as available, according to embodiments of the present invention. Responsive to detecting a change in unreserved resources in the host, application resource scheduler 132 performs one or more manipulations on the underlying resource pools and virtual machines to reduce the amount of resources shown as available to the application workload scheduler 126, thereby influencing its scheduling and task placement policies. In the example depicted in FIG. 5B, the amount of unreserved memory within host 108-2 has been decreased because of reservations for the sibling VMs 112-1 within the host 108-2. Accordingly, application resource scheduler 132 may perform a variety of manipulations to reduce the amount of resources seen as available by application workload scheduler 126—manipulations that may be operations inverse to those described above.

For example, as shown in FIG. 5B, application resource scheduler 132 powers off one or more worker VMs (depicted as a shaded task VM 506) based on a change in the determined amount of unreserved resources. In one embodiment, application resource scheduler 132 selects and powers off one or more task VMs having a total resource allocation that offsets a corresponding decrease in the amount of unreserved resources. It should be recognized that the workload scheduler 126 may detect, by way of node manager 310, the powered off tasks VMs are no longer reachable or responsive, thereby simulating a node failure. Alternatively, the powered off tasks VMs may proactively transmit a warning indication of unavailability prior to powering off. Workload scheduler 126 then modifies its scheduling and task placement based on the reduced amount of resources seen as available. Similarly, application resource scheduler 132 may decrease a resource allocation for a particular worker VM based on the detected change in amount of unreserved resources. In another example shown in FIG. 5B, application resource scheduler 132 modifies one or more task VMs to decrease the number of advertised slots 504 available for performing tasks of the distributed computing application. Workload scheduler 126 modifies its scheduling and task placement based on the advertisement by the task VM of an amount of available resources that are less than previously advertised, or advertisement of an amount of available slots that are less than previously advertised.

In some embodiments, application resource scheduler 132 may select which task VM to manipulate (e.g., power off) based on one or more performance metrics that indicate resource activity of the task VM within the distributed computing application. In addition to the metrics received from virtualization management module 130, application resource scheduler 132 may communicate with the workload scheduler 126 (e.g., via API of the workload scheduler 126) to get information about the cluster, including status on the cluster, metrics on the cluster, scheduler information, information about nodes in the cluster, and information about applications on the cluster. As such, application resource scheduler 132 may determine that a particular task VM is underutilized based on cluster metrics indicating status of the task VM, and target the task VM to be powered off. It should be recognized that any existing tasks running within the targeted task VM may be rescheduled by workload scheduler 126 to be performed on a different task VM, according to known techniques for distributed computing.

Referring back to FIG. 4, responsive to determining the workload priority of the application workload is neutral or lower than the non-application workloads, application resource scheduler 132 modifies one or more resource controls of resource pools (e.g., resource pool 114-2) that contain VMs belonging to the application workload of interest based on the workload priority, at step 412. In some embodiments, application resource scheduler 132 may modify (e.g., via API call to virtualization management module 130) the resource pool to have a low shares value that specifies a lower relative priority for the resource pool 114-2 when competing for resources (e.g., CPU, memory) with sibling resource pools 114-1 and 114-3 having VMs that run non-application workloads 122. It is appreciated that the modified resource controls are then respected by the underlying virtualized environment when allocating computing resources of hardware platform 118 (e.g., memory 202, CPU 204). For example, while the distributed application workload is running on a host, any subsequent contention may take memory from the VMs 112 belonging to the distributed computing application in accordance with its low shares.

At step 414, application resource scheduler 132 determines an amount of "spare" or available computing resources within hosts 108. In one embodiment, application resource scheduler 132 determines an amount of available CPU and memory resources based on metrics provided by virtualization management module 130. In one embodiment, application resource scheduler 132 determines the amount of available resources as the lesser of the amount of unreserved resources, as described above, and the amount of inactive resources (i.e., HostMemAvailable=MIN(HostMemInactive, HostMemUnreserved)). The application resource scheduler calculates for each host and summates the amount of inactive resources as the difference between the amount of memory capacity of the host and the estimated amount of active memory. Application resource scheduler 132 may estimate the amount of active memory by obtaining (e.g., via API) a memory counter (e.g., memory.active.average) indicating an amount of memory that is actively used on a host, as estimated by a hypervisor running thereon, based on recently touched memory pages. In an alternative embodiment, application resource scheduler 132 determines a conservative estimate of the amount of available resources as the difference between the amount of memory capacity of the host and the combination of the amount of reserved memory and estimated active memory (i.e., HostMemAvailableConservative=HostMemCapacity−(HostMemReserved+HostMemActive)).

In another embodiment, application resource scheduler 132 calculates a composite host-level metric that specifies an amount of resources desired by VMs using per-VM metrics. For example, application resource scheduler 132 may calculate a "VM-desired memory" metric as the greater of the amount of reserved memory and the estimated amount of active memory (i.e., HostMemDesired=MAX(HostMemReserved, HostMemActive). The application resource scheduler 132 may then estimate an amount of available resources as the difference between the memory capacity of the host and the amount of VM-desired memory (i.e., HostMemAvailable=HostMemCapacity−HostMemDesired).

At step 416, application resource scheduler 132 modifies the amount of computing resources that the application workload scheduler 126 sees as available based on the determined amount of available resources in hosts 108. In one embodiment, application resource scheduler 132 manipulates the virtualized infrastructure comprised of virtual machines and resource pools (e.g., resource pool 114-2) that underlie the distributed computing application 124 to change the amount of resources believed by the workload scheduler to be available, according to the amount of available resources, thereby influencing the scheduling and placement strategy of application workload scheduler 126 for executing an application workload. Application resource scheduler 132 may perform manipulations similar to those described above in step 410, including powering on and off additional VMs, modifying the amount of resources allocated to existing VMs, modifying the amount of advertised slots for performing tasks within a worker node, etc., except the manipulations are performed based on the amount of available resources, not unreserved resources. It should be recognized that in step 416, application resource scheduler 132 continues to monitor the availability of available resources on an ongoing basis, and expands and contracts the amount of resources that application workload scheduler 126 sees as available for running its jobs based on the determined amount of available resources, as described above in conjunction with FIG. 5B.

Figure 6:
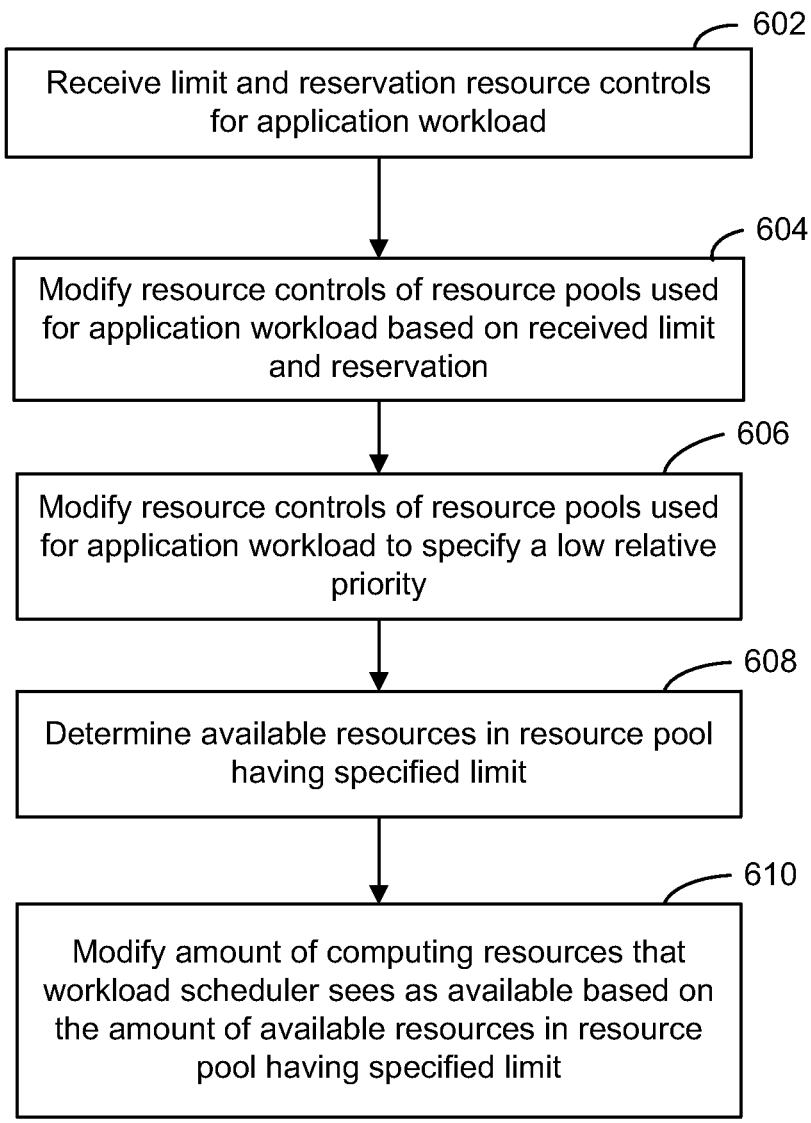
FIG. 6 is a flow diagram that illustrates steps for a method of managing computing resources of a virtualized environment having a limited resource pool, according to an embodiment of the present invention

According to one embodiment, an administrator may wish to specify reservations and limits for an application workload. For example, an administrator may wish to configure application workload to use available resources up to a specified limit to run the application workload, while allowing preemption of the application workload's resource use. FIG. 6 is a flow diagram that illustrates steps for a method of managing computing resources of a virtualized environment having a limited resource pool, according to one embodiment of the present invention. It should be recognized that, even though the method is described in conjunction with the system of FIGS. 1 and 3, any system configured to perform the method steps is within the scope of embodiments of the invention.

At step 602, application resource scheduler 132 receives, from a user, resource controls, such as reservations and limits, for the application workload, which application resource scheduler 132 sets, at step 604, as resource controls of resource pools (e.g., resource pool 114-2) that contain VMs belonging to the application workload of interest to be respected by the underlying virtual environment scheduler (e.g., virtualization management module 130). In some embodiments, at step 606, application resource scheduler 132 modifies (e.g., via API call) the resource pool to have a low shares value that specifies a low relative priority for the resource pool 114-2 when competing for resources (e.g., CPU, memory) with sibling resources pools. Accordingly, while application workload is running on a host, any subsequent contention for resources will take memory or CPU from the task VMs 314 in accordance with the low shares of the resource pool 114-2.

At step 608, application resource scheduler 132 determines an amount of available computing resources within the resource pool with the specified limit. In one embodiment, application resource scheduler 132 determines an amount of available resources (e.g., CPU 204, memory 202) in the resource pool having a limit set based on metrics provided by virtualization management module 130. In one embodiment, application resource scheduler 132 determines the amount of available resources for the limited resource pool as the lesser of the amount of unreserved resources within the resource pool and the amount of inactive resources in the resource pool (i.e., RPMemAvailable=MIN(RPMemInactive, RPMemUnreserved)). In one embodiment, application resource scheduler 132 calculates the amount of unreserved resource within the resource pool as the difference between the memory limit for the resource pool and the amount of reserved memory in the resource pool (i.e., RPMemUnreserved=RPMemLimit−RPMemReserved). For example, application resource scheduler 132 may query (e.g., via API call) virtualization management module 130 to obtain the limit resource setting for the resource pool and a memory counter (e.g., memory.reservedCapacity.average) indicating a total amount of memory reservation used by powered-on virtual machines for the resource pool and virtualization overhead on the host. Application resource scheduler 132 calculates the amount of inactive resources within the resource pool as the difference between the memory limit for the resource pool and the amount of active memory within the resource pool (i.e., RPMemInactive=RPMemLimit−RPMemActive). Application resource scheduler 132 may query to obtain a memory counter (e.g., memory.active.average) that estimates the amount of memory that is actively used based on the recently touched memory pages.

At step 610, application resource scheduler 132 modifies the amount of computing resources that workload scheduler 126 sees as available based on the amount of available resources in the resource pool having the specified limit (e.g., RPMemAvailable). Application resource scheduler 132 uses the amount of available resources in the resource pool having the specified limit to estimate how much memory is available for the burst of resource usage by application workload within the limited resource pool. Application resource scheduler 132 then computes how much of the burst of resources can be used on each host using the amount of available resources on the host (e.g., HostMemAvailable). It should be recognized that the limit for a resource pool is divvied between hosts 108 having VMs 112 in the resource pool, and the limit for the resource pool may be re-divvied to increase the amount of resources used on a host when the application workload uses an increasing amount of resources relative to non-application workloads.

It should be recognized that resource controls (e.g., reservations, limits, and shares) may be applied to storage, network, and other I/O resources, in addition to the memory and CPU resources discussed above. In some embodiments, it has been determined that main sources of network traffic in a distributed computing application may come from intercommunication between node VMs. For example, in a Hadoop application, main resources of network traffic may come from task containers 314 configured as "mappers" and accessing data from a Data Node 312, and task containers 314 configured as "reduces" and pulling up intermediate (e.g., map output) data from a Node Manager 310. In some embodiments, an amount of "flow" may be attributed to the VMs of the distributed computing application based on resource controls (e.g., reservation, limit, shares) for network traffic. In some embodiments, network bandwidth allocated to a VM may be associated with the sender of the network traffic, particularly, based on traffic associated with a particular NIC. In some embodiments, it has been further determined that significant amounts of storage I/O traffic in a Hadoop application are generated by Data Nodes 312 accessing HDFS data, and Node Managers 310 accessing temporary intermediate data (e.g., "tmp" data). In some embodiments, an amount of storage I/O may be attributed to the VMs of the distributed computing application based on resource controls (e.g., reservations, limit, shares).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing a cluster for a distributed computing application, the method comprising:
receiving, from a user, an indication specifying a workload priority of an application workload for executing a distributed computing application relative to other workloads, wherein the other workloads are not for executing the distributed computing application in a virtualized computing system, wherein the distributed computing application includes a workload scheduler configured to distribute execution of the application workload to a plurality of virtual machines (VMs) allocated from a resource pool within the virtualized computing system;
modifying a resource control for the resource pool based on the workload priority;
responsive to determining that the workload priority indicates a higher priority for executing the distributed computing application relative to the other workloads, determining an amount of available computing resources comprised of resources not reserved by other workloads within the virtualized computing system;

responsive to determining that the workload priority does not indicate a higher priority for executing the distributed computing application relative to the other workloads, determining the amount of available computing resources comprised of inactive resources held by the other workloads within the virtualized computing system; and modifying a first VM of the plurality of VMs to increase an amount of computing resources seen by the workload scheduler to be available for execution of the application workload based on the determined amount of available computing resources.

2. The method of claim 1, wherein the step of modifying the resource control for the resource pool comprises:
setting a high shares value for the resource pool based on the workload priority indicating a higher relative priority of the application workload to the other workloads.

3. The method of claim 1, wherein the step of modifying the first VM of the plurality of VMs further comprises:
launching execution of the first VM, wherein the first VM has a resource allocation based on the determined amount of available computing resources.

4. The method of claim 1, wherein the step of modifying the first VM of the plurality of VMs further comprises:
modifying a workload capacity of the first VM based on the determined amount of available computing resources, wherein the workload capacity is transmitted to the workload scheduler to advertise an amount of workload that can be handled by the first VM.

5. The method of claim 1, wherein the step of modifying the resource control for the resource pool comprises:
setting a low shares value for the resource pool based on the workload priority indicating a lower relative priority of the application workload to the other workloads.

6. The method of claim 1, further comprising:
determining a change in the amount of available computing resources within the virtualized computing system; and
modifying a second VM of the plurality of VMs to decrease the amount of computing resources seen by the workload scheduler to be available for execution of the application workload based on the determined change in the amount of available computing resources.

7. The method of claim 6, wherein the step of modifying the second VM of the plurality of VMs further comprises:
retrieving, from the workload scheduler, a metric indicating performance of the plurality of VMs within the distributed computing application; and
selecting the second VM for modification based on a determination that the second VM is underutilized according to the retrieved metric.

8. The method of claim 1, wherein the resource control is used by the virtualized computing system for allocating hardware resources for executing virtual machines.

9. A non-transitory computer-readable storage medium comprising instructions that, when executed in a computing device, manage a cluster for a distributed computing application by performing the steps of:
receiving, from a user, an indication specifying a workload priority of an application workload for executing a distributed computing application relative to other workloads, wherein the other workloads are not for executing the distributed computing application in a virtualized computing system, wherein the distributed computing application includes a workload scheduler configured to distribute execution of the application workload to a plurality of virtual machines (VMs) allocated from a resource pool within the virtualized computing system;

modifying a resource control for the resource pool based on the workload priority;
responsive to determining that the workload priority indicates a higher priority for executing the distributed computing application relative to the other workloads, determining an amount of available computing resources comprised of resources not reserved by other workloads within the virtualized computing system;
responsive to determining that the workload priority does not indicate a higher priority for executing the distributed computing application relative to the other workloads, determining the amount of available computing resources comprised of inactive resources held by the other workloads within the virtualized computing system; and
modifying a first VM of the plurality of VMs to increase an amount of computing resources seen by the workload scheduler to be available for execution of the application workload based on the determined amount of available computing resources.

10. The non-transitory computer-readable storage medium of claim 9, wherein the step of modifying the resource control for the resource pool comprises:
setting a high shares value for the resource pool based on the workload priority indicating a higher relative priority of the application workload to the other workloads.

11. The non-transitory computer-readable storage medium of claim 9, wherein the step of modifying the first VM of the plurality of VMs further comprises:
launching execution of the first VM, wherein the first VM has a resource allocation based on the determined amount of available computing resources.

12. The non-transitory computer-readable storage medium of claim 9, wherein the step of modifying the first VM of the plurality of VMs further comprises:
modifying a workload capacity of the first VM based on the determined amount of available computing resources, wherein the workload capacity is transmitted to the workload scheduler to advertise an amount of workload that can be handled by the first VM.

13. The non-transitory computer-readable storage medium of claim 9, wherein the step of modifying the resource control for the resource pool comprises:
setting a low shares value for the resource pool based on the workload priority indicating a lower relative priority of the application workload to the other workloads.

14. The non-transitory computer-readable storage medium of claim 9, further comprising:
determining a change in the amount of available computing resources within the virtualized computing system; and
modifying a second VM of the plurality of VMs to decrease the amount of computing resources seen by the workload scheduler to be available for execution of the application workload based on the determined change in the amount of available computing resources.

15. The non-transitory computer-readable storage medium of claim 14, wherein the step of modifying the second VM of the plurality of VMs further comprises:
retrieving, from the workload scheduler, a metric indicating performance of the plurality of VMs within the distributed computing application; and
selecting the second VM for modification based on a determination that the second VM is underutilized according to the retrieved metric.

16. The non-transitory computer-readable storage medium of claim 9, wherein the resource control is used by the virtualized computing system for allocating hardware resources for executing virtual machines.

17. A virtualized computing system for executing for executing a distributed computing application, the virtualized computing system comprising:
  a plurality of hosts configured to execute a plurality of virtual machines (VMs), wherein the plurality of VMs are organized into a first resource pool designated for the distributed computing application;
  a workload scheduler configured to distribute execution of an application workload for executing the distributed computing application to a plurality of nodes, wherein the plurality of nodes are virtual machines allocated from the first resource pool, wherein the workload scheduler is not configured to be aware that the plurality of nodes are VMs;
  an application resource scheduler configured to perform an operation for managing a cluster for a distributed computing application, the operation comprising:
    receiving, from a user, an indication specifying a workload priority of the application workload relative to other workloads, wherein the other workloads are not for executing the distributed computing application in a virtualized computing system;
    modifying a resource control setting for the first resource pool based on the workload priority;
    determining an amount of available computing resources within the virtualized computing system; and
    modifying a first VM of the plurality of VMs to increase an amount of computing resources seen by the workload scheduler to be available for execution of the application workload based on the determined amount of available computing resources;
  wherein the operation comprising the step of determining an amount of available computing resources within the virtualized computing system further comprises:
    responsive to determining that the workload priority indicated a higher priority for executing the distributed computing application relative to the other workloads, determining an amount of available computing resources comprised of resources not reserved by other workloads within the virtualized computing system; and
    responsive to determining that the workload priority does not indicate a higher priority for executing the distributed computing application relative to the other workloads, determining the amount of available computing resources comprised of inactive resources held by the other workloads within the virtualized computing system.

18. The virtualized computing system of claim 17, wherein the operation further comprises:
  determining a change in the amount of available computing resources within the virtualized computing system; and
  modifying a second VM of the plurality of VMs to decrease the amount of computing resources seen by the workload scheduler to be available for execution of the application workload based on the determined change in the amount of available computing resources.

19. The virtualized computing system of claim 17, wherein the operation comprising the step of modifying the second VM of the plurality of VMs further comprises:
  retrieving, from the workload scheduler, a metric indicating performance of the plurality of VMs within the distributed computing application; and
  selecting the second VM for modification based on a determination that the second VM is underutilized according to the retrieved metric.

* * * * *